United States Patent
Nelson et al.

(10) Patent No.: US 11,601,447 B1
(45) Date of Patent: Mar. 7, 2023

(54) REMOTE MONITORING AND ASSESSMENT OF OPERATING SYSTEM PARAMETERS

(71) Applicant: T-MOBILE INNOVATIONS LLC, Overland Park, KS (US)

(72) Inventors: Tracy L. Nelson, Overland Park, KS (US); Lyle W. Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 210 days.

(21) Appl. No.: 17/090,759

(22) Filed: Nov. 5, 2020

(51) Int. Cl.
*H04L 29/00* (2006.01)
*H04L 9/40* (2022.01)
*H04W 12/121* (2021.01)

(52) U.S. Cl.
CPC ....... *H04L 63/1416* (2013.01); *H04W 12/121* (2021.01)

(58) Field of Classification Search
CPC .......................... H04L 63/1416; H04W 12/121
USPC ......................................................... 726/23
See application file for complete search history.

(56) References Cited

U.S. PATENT DOCUMENTS

| 2019/0260636 A1* | 8/2019 | Sun | H04L 41/0895 |
| 2020/0112492 A1* | 4/2020 | Chatras | H04W 48/14 |

* cited by examiner

*Primary Examiner* — Brandon Hoffman
*Assistant Examiner* — Michael D Anderson

(57) ABSTRACT

A method for monitoring and identifying changes in one or more parameters of an OS is disclosed. The method includes performing a measurement by a measurement application of a first computer system of the one or more parameters of a first OS executing on the first computer system, receiving the measurement of the one or more parameters of the first OS by an appraisal application, and storing the measurement of the one or more parameters of the first OS in a data store. The method also includes comparing the measurement with one or more first OS parameter norms associated with the first network slice, and identifying a change in the one or more parameters of the first OS by the appraisal application in response to comparing the measurement of the one or more parameters of the first OS with the one or more first OS parameter norms.

17 Claims, 7 Drawing Sheets

REMOTE MONITORING AND ASSESSMENT OF OPERATING SYSTEM PARAMETERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network slices provide a dedicated communication network for use by a user, such as an enterprise, organization, or individual, where the dedicated communication network may be delivered as a virtual resource to the user. From the point of view of the user, the network slice may behave as if it were a separate network infrastructure, but the network slice may be delivered by virtualized computing resources provided by a common physical communication and computing infrastructure. In some networks, including 5G networks, each network slice may be delivered in the form of a network slice container (also referred to herein as a "containerized network slice") hosted by a computer system or server of the network. The server may host a plurality of containers each housing a unique network slice. An underlying operating system (OS) of the server may support each of the plurality of containerized network slices hosted by the server, the OS of the server being partitioned between the plurality of containerized network slices.

SUMMARY

In an embodiment, a method for monitoring and identifying changes in one or more parameters of an OS is disclosed. The method comprises performing a measurement by a measurement application of a first computer system of the one or more parameters of a first OS executing on the first computer system, wherein the first OS is associated with a first network slice instantiated by the first computer system. The method additionally comprises receiving the measurement of the one or more parameters of the first OS by an appraisal application executing on a second computer system communicatively coupled to the first computer system, and storing the measurement of the one or more parameters of the first OS in a data store communicatively coupled to the second computer system. The method further comprises comparing the measurement of the one or more parameters of the first OS by the appraisal application with one or more first OS parameter norms associated with the first network slice, the one or more first OS parameter norms stored in the data store and determined from measurements of one or more parameters of a first plurality of OSs. The method further comprises identifying a change in the one or more parameters of the first OS by the appraisal application in response to comparing the measurement of the one or more parameters of the first OS with the one or more first OS parameter norms.

In another embodiment, a method for monitoring and identifying changes in one or more parameters of an OS is disclosed. The method comprises performing a measurement by a measurement application of a first computer system of the one or more parameters of the OS executing on the first computer system, receiving the measurement of the one or more parameters of the OS by an appraisal application executing on a second computer system communicatively coupled to the first computer system, and storing the measurement of the one or more parameters of the OS immutably in at least one blockchain of a data store communicatively coupled to the second computer system. The method additionally comprises comparing the measurement of the one or more parameters of the OS by the appraisal application with a previous measurement of the one or more parameters of the OS performed by the measurement application and stored in the at least one blockchain, and identifying a change in the one or more parameters of the OS by the appraisal application in response to comparing the measurement of the one or more parameters of the OS with the previous measurement of the one or more parameters of the OS. The method further comprises automatically changing the one or more parameters of the OS to correspond to the previously measured one or more parameters of the OS by a remediation application executing on the second computer system in response to identifying the change in the one or more parameters of the OS.

In yet another embodiment, system for monitoring and identifying changes in one or more parameters of an OS is disclosed. The system comprises a processor, a non-transitory memory, and one or more applications stored in the non-transitory memory that, when executed by the processor receive a measurement of the one or more parameters of a first OS executing on a computer system, wherein the measurement of the one or more parameters of the first OS is performed by a measurement application executing on the computer system, and wherein the first OS is associated with a first network slice instantiated by the computer system. The one or more applications stored in the non-transitory memory that, when executed by the processor additionally store the measurement of the one or more parameters of the first OS in a data store communicatively coupled to the non-transitory memory, compare the measurement of the one or more parameters of the first OS with one or more first OS parameter norms associated with the first network slice, the one or more first OS parameter norms stored in the data store and determined from measurements of one or more parameters of a first plurality of OSs, and identify a change in the one or more parameters of the first OS in response to comparing the measurement of the one or more parameters of the first OS with the one or more first OS parameter norms.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
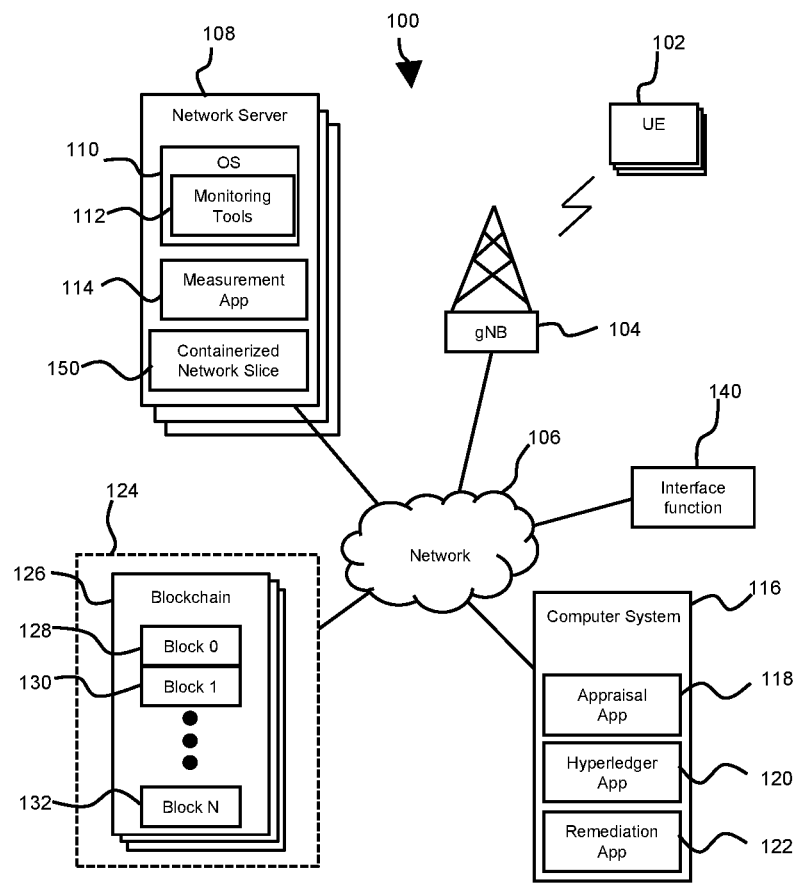
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As described above, in some networks, including 5G networks, a plurality of network slices may be delivered in the form of network slice containers each hosted by a physical computer system or server of the network, where each containerized network slice may include a unique set of virtualized functions and/or services accessible by a user of the network. Additionally, an underlying OS of the server may support each of the plurality of containerized network slices hosted by the server whereby the OS of the server is partitioned between the plurality of containerized network slices. To state in other words, each containerized network slice may include a partition of the underlying OS of the server on which the containerized network slice is hosted.

Given that a plurality of containerized network slices of the network may be hosted simultaneously on the same server, there is a possibility malicious software or malware executing in a first containerized network slice may corrupt the underlying OS (including a kernel of the underlying OS) of the server hosting the plurality of containerized network slices. With the underlying OS infected by the malware, the malware may spread to and compromise other containerized network slices also hosted on the server. Thus, by hosting a plurality of network slices on a common underlying OS, there is a risk malware may propagate between a plurality of network slices of a network. Similarly, there is a risk a hacker or other malicious actor, having gained illicit access to a first containerized network slice, may illicitly obtain access to other containerized network slices supported by a common underlying OS.

Additionally, operating systems (OSs), such as at least some Linux OSs, may be equipped with one or more monitoring tools (e.g., the monitoring tools may be embedded within the OS) for monitoring a state of the OS, including a state of the kernel of the OS. While monitoring tools may monitor the state of the OS, monitoring tools typically are not configured to perform measurements of one or more parameters of the OS such that the measured one or more parameters may be analyzed and/or communicated to one or more other computer systems. Instead, the monitoring tools may generally only store a log of the outputs generated by the monitoring tools. Additionally, given that the monitoring tools are embedded in the OS, the monitoring tools themselves may become compromised in the event that the OS becomes infected by malware or is illicitly compromised by a hacker. For example, having gained access to the OS, a hacker may manipulate the logs generated by the monitoring tools to mask the compromisation of the OS or otherwise interfere with the operation of the computer system on which the OS is executing.

Further, computer systems may include one or more measurement tools which are located outside of and run on top of an OS of the computer system. The measurement tools may measure a particular parameter of the OS and may report a change to the parameter. However, measurement tools are typically peer-to-peer systems (not peer-to-many) comprising a monitored resource and a receiving resource and lack the ability to either store the measurements performed by the measurement tool or to aggregate measurements performed by a plurality of measurement tools.

In an embodiment, measurements of one or more parameters of an OS of a computer system such as a network server, including one or more parameters of the OS kernel, are stored in a location remote from the OS, such as a data store communicatively coupled to the network server. The stored measurements of the one or more parameters of the OS may be compared with current measurements of the one or more parameters of the OS to identify any changes to the one or more parameters of the OS that may have taken place. An appropriate remedial action may be taken in response to identifying a change in the one or more parameters of the OS.

In some embodiments, the comparison between the stored measurements of the one or more parameters of the OS and the currently determined measurements of the one or more parameters may be performed on the network server or may be performed remotely on a different computer system communicatively coupled to the network server. The measurements of the one or more parameters of the OS may be transmitted or telegraphed to a different computer system to be stored in a secure, immutable data structure whereby the stored measurements may not be altered by malware or a malicious actor seeking illicit access to the stored measurements. For example, the measurements of the one or more parameters of the OS may be stored in one or more blockchains or a hyperledger register.

In an embodiment, measurements of one or more parameters of a plurality of OSs associated with a plurality of computer systems or network servers may be stored in a single location and compared against each other to establish one or more OS parameter norms. The one or more OS parameter norms may be associated with a particular network slice of a plurality of network slices of the network. For example, the one or more OS parameter norms may be associated with an enhanced mobile broadband (eMBB) network slice, a massive machine-type communications (mMTC) network slice, and an ultra-reliable low-latency communications (URLLC) network slice of a 5G network. Alternatively or in addition, the one or more OS parameter norms may be associated with a network slice corresponding to a particular enterprise or enterprise category, such as a railroad companies enterprise category, an electric utilities enterprise category, a food processing enterprise category, etc.

The one or more OS parameter norms may be compared with currently determined measurements of one or more parameters of an OS (e.g., an OS hosting a containerized network slice associated with the one or more OS parameter norms) to identify any changes to the one or more parameters of the OS that may have taken place. As opposed to simply comparing a later set of OS parameters to an earlier assumed "good" set of OS parameters from the same computer system, the comparison of the currently determined measurements with the one or more OS parameter norms may be used to trigger a remedial action.

At least some of the stored measurements and/or stored results of comparisons between measured OS parameters (and/or comparisons between currently measured OS parameters and OS parameter norms) may be available to third party users (e.g., enterprises using one or more network slices of the network) via an application programming interface (API). In an embodiment, the API may be extended by 5G service capability exposure function (SCEF)/network exposure function (NEF) functionality.

As described above, measurements of the one or more OS parameters may be stored in a secure data structure such as one or more blockchains or hyperledgers whereby the stored information is made immutable, preventing it from being tampered with by malware and/or a hacker. Additionally, the measured one or more parameters of the OS may be transmitted to a central data store hosting the blockchains as encrypted data to prevent intrusion.

A specialized ledger may be used that is configured to hold the blockchains and apply specific rules or instructions to the last block of each of the blockchains. The instructions may establish a baseline or initial set of one or more parameters of the OS which may be assumed to be uncompromised and which may be used to more easily and rapidly identify changes in the one or more parameters, minimizing the time required to perform remedial actions in response to identifying a change. Conversely, current tools rely on log files and due to the verbose nature of log files, the early warning system may be repressed, data storage is large, and the log files themselves may be subject to hacking whereby the log reflects "good" information when in actuality the OS has been compromised. The specialized secure data structure described above may prevent such a scenario from taking place.

As described above, remedial actions may be performed in response to identifying a change to the one or more parameters of the OS. In an embodiment, the one or more parameters of the OS that have been changed may be returned to previously recorded values upon identifying a change to the one or more parameters. Alternatively or in addition, a notification may be provided to a stakeholder (e.g., a network or system administrator, a user, etc.) for further investigation upon identifying a change to the one or more parameters. Alternatively or in addition, the computer system comprising the OS may be interrupted upon identifying a change to one or more parameters of the OS of the computer system. Particularly, the computer system comprising the OS may be prevented from performing one or more actions that involve interacting with a network to which the computer system is communicatively coupled. For example, the computer system may be prevented from communicating to another computer using the network. Alternatively or in addition, the computer system may be prevented from transferring code, files, etc., using the network. Alternatively or in addition, the computer system may be prevented from accessing one or more resources of the network, such as data stores, network functions, etc.

In an embodiment, a SCEF/NEF interface function may be used to confirm that one or more parameters of an OS of a computer system (e.g., part of a private/public domain) seeking to communicate via a network (e.g., a 5G edge or core network) conform to a baseline set of parameters of the OS or a set of OS parameter norms before granting communication via the network. In this manner, sensitive information stored in the network, (e.g., secure data, personally identifiable information (PII), etc.) may be protected. SCEF/ NEF interface functions, such as 5G SCEF/NEF interface functions, are generally composed of interfaces that allow APIs, or web interactions, to travel from a private/public domain into a 5G edge or core network. However, traditionally SCEF/NEF interfaces are not configured to provide a gatekeeping function and instead are only typically configured to provide an unrestricted communication channel. In an embodiment, the SCEF/NEF interface function could be conditioned to appropriately allow a remote network slice (instantiated on the computer system seeking to communicate via the network) to communicate into a 5G core network.

The embodiments described herein are a specific technical solution to a specific technical problem. The technical problem includes (1) aggregating measurements of one or more parameters of one or more OSs in a single location, (2) securely storing the aggregated measurements whereby the stored measurements may not be tampered with by malware, a malicious actor, etc., and (3) comparing the stored, previous measurements with currently determined measurements to determine a change in the one or more parameters of the one or more OSs. Embodiments disclosed herein address these challenges through an appraisal application executing on a computer system remote from the one or more computer systems hosting the OSs to be assessed by the appraisal application, the appraisal application being configured to receive measurements from measurement tools executing on one or more computer systems, such as network servers, communicatively coupled to the computer system hosting the appraisal application. Embodiments disclosed herein also address these challenges by storing the measurements of the one or more parameters of one or more OSs in a secure data structure such as one or more blockchains whereby the stored data may be made immutable and thus may not be tampered with by malware, a malicious actor, etc. Embodiments disclosed herein further address these challenges by comparing the measurements of the one or more parameters of one or more OSs with previous measurements which may correspond to a baseline or one or more OS parameter norms to identify a change in the one or more OSs.

Turning to FIG. 1, a communication system 100 is described. In an embodiment, the communication system 100 comprises a plurality of electronic devices (user equipment—UE) 102, an access node 104, a network 106, one or more computer systems or network servers 108, a computer system 116, a private data store 124, and an interface function 140. The UE 102 may be one or more desktop computers, workstations, laptop computers, tablet computers, and/or notebook computers. The access node 104 may provide communication coupling from the UE 102 to the network 106 according to a 5G protocol, for example 5G, 5G New Radio, or 5G LTE radio communication protocols. The access node 104 may provide communication coupling from the UE 102 to the network 106 according to a long term evolution (LTE), a code division multiple access (CDMA), and/or a global system for mobile communication (GSM) radio communication protocol. The access node 104 may be referred to for some contexts as a gigabit Node B (gNB), an enhanced Node B (eNB), a cell site, or a cell tower.

While not shown, some of the UEs 102 may be communicatively coupled to the network 106 via a WiFi access point or another non-cellular radio device. Additionally, while a single access node 104 is illustrated in FIG. 1, it is understood that communication system 100 may comprise any number of access nodes 104. The network 106 of communication system 100 may comprise one or more public networks, one or more private networks, or a combination thereof. As described further herein, network 106 may comprise a 5G core network. While shown as communicatively coupled to the network 106, computer system 116, data store 124, and interface function 140 may be considered part of network 106 and are illustrated as separate from network 106 in FIG. 1 to promote discussing their roles with respect to UE 102 and network servers 108, as will be discussed further herein.

At least some of the network servers 108 of communication system 100 may include an OS 110, a measurement application 114, and a plurality of containerized network slices 150. The OS 110 of the network server 108 may include a kernel (not labeled in FIG. 1) and one or more monitoring tools 112. Thus, monitoring tools 112 are embedded in the OS 110 and are not hosted by the OS 110 like measurement application 114. Monitoring tools 112 may continually monitor a state of the OS 110, including a state of the kernel of OS 110. For example, the monitoring tools 112 may monitor outputs of the kernel of OS 110. A non-exhaustive list of exemplary monitoring tools which monitoring tools 112 may comprise includes local network monitoring tools (offer a report of machines being used, remote desktop and/or server control and security, etc.), retrieving network monitoring tools (retrieve information from all networks and aggregate them onto a single platform), cloud based network monitoring tools (diagnose issues on cloud servers), and/or domain name system (DNS) based web filters.

The measurement application 114 of at least some network servers 108 executes on the network server 108 by running on top of or being hosted by the OS 110 and thus is not embedded in the OS 110 as with monitoring tools 112. Rather than continuously monitoring the OS 110, measurement application 114 may measure one or more parameters of OS 110 at a particular point in time, including one or more parameters of the kernel of OS 110. Particularly, measurement application 114 may measure an output of the monitoring tools 112 of OS 110 to thereby measure the one or more parameters of the OS 110. In an embodiment, the one or more parameters of OS 110 measured by measurement application 114 may comprise a "snapshot" of a state of the OS 110, including a state of the kernel of OS 110. The one or more parameters of OS 110 measured by the measurement application 114 may be associated with a configuration of the kernel of the OS 110, the performance of the kernel of the OS 110, and/or particular attributes of files associated with the kernel of the OS 110. In an embodiment, the one or more parameters of OS 110 may comprise performance parameters, resource parameters, and/or bandwidth parameters.

For example, the one or more parameters of OS 110 measured by the measurement application 114 may include parameters corresponding to Linux kernel functions of the Linux Netfilter framework such as a transmission control protocol maximum segment size (TCP-MSS) function, a Redirect function, a datagram congestion control protocol (DCCP) connection tracking function, etc., which may have vulnerabilities making it possible for malicious actors to execute arbitrary code and/or cause a denial of service (DOS) attack. Other examples of the one or more parameters of OS 110 measured by the measurement application 114 may include parameters corresponding to Linux kernel drivers such as a user datagram protocol (UDP) driver, an InfiniBand driver, etc., which may have vulnerabilities making it possible for malicious actors to execute arbitrary code. The one or more parameters of OS 110 measured by the measurement application 114 may include parameters corresponding to other kernel functions or parameters, such as a Linux Kernel-based Virtual machine (KVM) function, memory buffer overflows, etc. This list of parameters is not exhaustive and may be understood to include a brief list of examples.

In addition to measuring one or more parameters of the OS 110, the measurement application 114 of at least some of the network servers 108 is configured to transmit or telegraph the measured one or more parameters of OS 110 to the computer system 116 of communication system 100. Thus, in at least some embodiments, the measurement application 114 of a plurality of network servers 108 transmit measurements of one or more parameters of the OS 110 of the network server 108 to computer system 116. In other words, computer system 116 may aggregate measurements of one or more parameters of OSs 110 of a plurality of network servers 108 in a peer-to-many relationship.

Measurement application 114 may periodically at a predetermined frequency measure and transmit the one or more parameters of OS 110. Alternatively or in addition, measurement application 114 may measure and transmit one or more parameters of OS 110 at non-periodic intervals in response to the occurrence of an event or a sequence of events associated with the network server 108, network 106, and/or other components of communication system 100. In an embodiment, measurement application 114 may encrypt the measurements of the one or more parameters of OS 110 prior to transmitting the measurements to ensure that the measurements of the OS 110 may not be tampered with or otherwise compromised by malware or a malicious actor attempting to access network server 108.

Each of the plurality of containerized network slices 150 is generally provided with an independent set of software functions and/or instantiations that both provide the behaviors of a communication network and bound the particular containerized network slice 150 and isolate it logically from the network 106. Rather than being provided by a virtual machine including its own OS which may typically increase redundant resource usage, the network slices hosted by network server 108 are provided in a container as containerized network slices 150, thereby allowing a single underlying OS 110 of network server 108 to support a number of isolated virtual functions and services. The containerized network slices 150 hosted by network server 108 may provide a private communication channel from one device to another device (e.g., between UE 102). Alternatively, the containerized network slice 150 can provide a variety of services that comprise either specialized or premium communication functionalities or are non-communication services.

Figure 2:
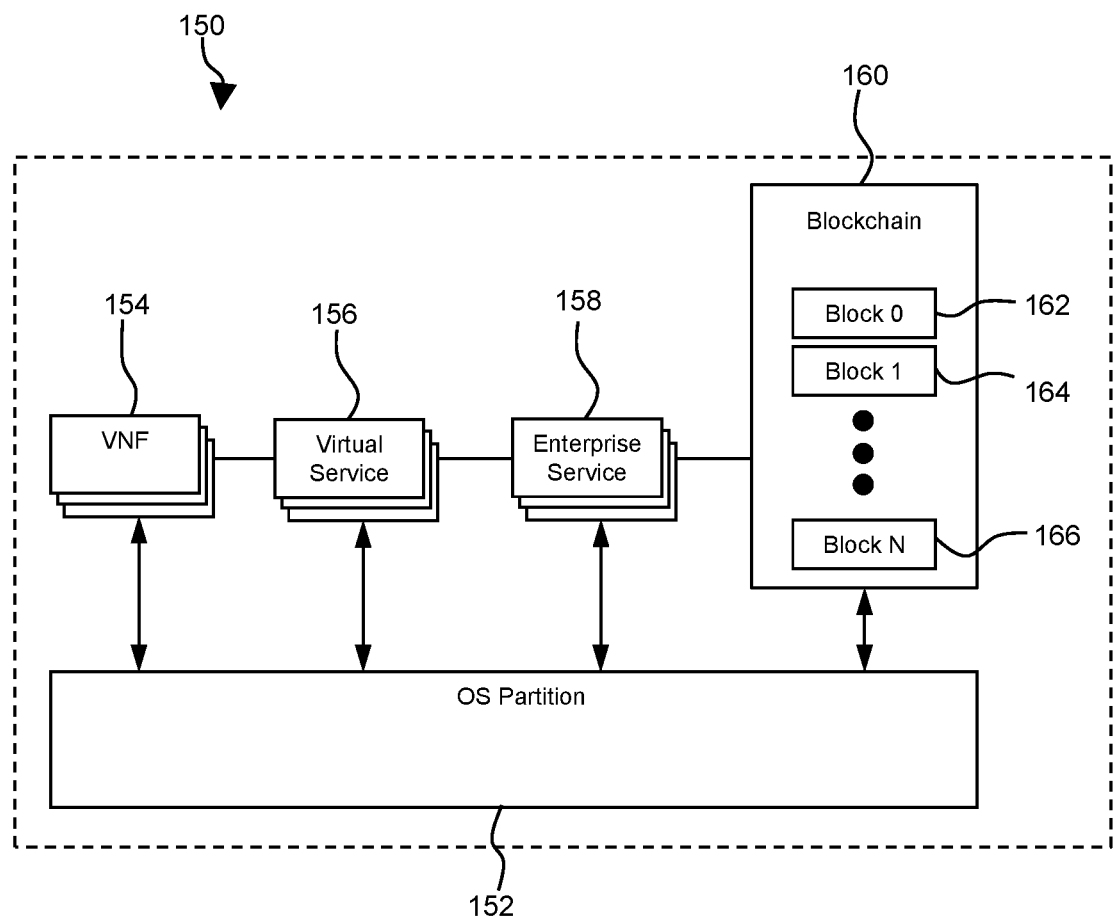
FIG. 2 is a block diagram of a network slice container according to an embodiment of the disclosure.

Turning now to FIG. 2, further details of an exemplary containerized network slice 150 is described. In an embodiment, the containerized network slice 150 comprises an OS partition 152, one or more virtual network functions (VNFs) 154, one or more virtual services 156, and a blockchain 160. While FIG. 2 illustrates a single exemplary containerized network slice 150, the other containerized network slices 150 hosted by network server 108 may be configured similarly as the containerized network slice 150 shown in FIG. 2 or at least include some features in common with the containerized network slice 150 shown in FIG. 2.

In some embodiments of the containerized network slice 150—for example a containerized network slice 150 instantiated by a communication service provider for use by an enterprise or other organization—further comprises one or more enterprise services 158. OS partition 152 may comprise a partition of the OS 110 of network server 108. Thus, each of the plurality of containerized network slices 150 hosted by network server 108 may comprise a partition of OS 110. For this reason, the corruption of one of the containerized network slices 150 (e.g., via malware, a hacker, etc.) may result in the corruption of other containerized network slices 150 hosted on the same network server 108 via the corruption of the underlying OS 110 hosting each of the plurality of containerized network slices 150.

The VNFs 154 may comprise network communication functionality that is delivered in the form of virtual network functions that are provided by software executing on top of OS partition 152. The virtual services 156 may comprise services delivered by software executing on top of OS partition 152. The VNFs 158 and the virtual services 156 may be provided by software developed by a communication service provider, for example developed by a wireless communication service provider.

In an embodiment, the containerized network slice 150 may comprise one of a eMBB network slice, a mMMTC network slice, and a URLLC network slice of a 5G network. In an embodiment, the containerized network slice 150 may be associated with a particular enterprise or enterprise category. For example, the enterprise services 158 may comprise services delivered by software executing on top of OS partition 152. The enterprise services 158 may be provided by software developed by an enterprise or a third party that are different from a communication service provider. For example, the enterprise services 158 of the containerized network slice 150 may be associated with a railroad companies enterprise category, an electric utilities enterprise category, a food processing enterprise category, etc.

The blockchain 160 of the exemplary containerized network slice 150 shown in FIG. 2 comprises a plurality of blocks: a first block 162, a second block 164, and a third block 166. It is understood that the blockchain 160 may comprise any number of blocks and that additional blocks may be added to the blockchain 160 over time. The first block 162 may be referred to as a genesis block or a block zero. The first block 162 can be considered to be the origin of the blockchain 160. The first block 162 may comprise information and/or microcode related to the containerized network slice 150 and or maintenance of the blockchain 160. Each subsequent block in the blockchain 160 may comprise a data content, a nonce or random number selected to satisfy a predefined condition, a hash value of the preceding block (this feature may be missing in the first block 162 because it has no preceding block in the blockchain 160), and a hash value calculated over (a) the data content of the block, (b) the nonce, and (c) the previous hash value. The nonce may be selected such that the hash value calculated over the block has a predefined number of leading zeros—for example four leading zeros—or some other predefined format.

The data content of each subsequent block in blockchain 160 may comprise data, parameter values, authentication credentials, and authorization credentials. The data content may additionally comprise microcode that may be executed by an orchestration module (not shown in FIG. 2) of the containerized network slice 150 provided to allow for the establishment of a communication channel via containerized network slice 150 for, e.g., one of the UE 102. The data content may further comprise sensitive information, including PII, which may be accessible to properly credentialed users, such as one of the UE 102. Microcode stored in the blocks of blockchain 160 may provide some restrictions or limitations on the processing provided for UE 102 by the VNF 154, the virtual service 156, or the enterprise service 158. The microcode may define some quality of service (QoS) or service level agreement (SLA) that applies to the UE 102, and the VNF 154, the virtual service 156, or the enterprise service 158 may provide functions or services to the UE 102 based on the QoS or SLA defined by the microcode. For example, by executing the microcode, the VNF 154, the virtual service 156, or the enterprise service 158 may configure itself so as to achieve the given QoS or SLA.

Returning to FIG. 1, computer system 116 of communication system 100 may generally include an appraisal application 118, a hyperledger application 120, and a remediation application 122 each of which execute on computer system 116. As described above, computer system 116 provides a central location that receives measurements performed by the measurement application 114 of each network server 108. As will be discussed further herein, appraisal application 118, upon receiving measurements of one or more parameters of an OS 110 of one of the network servers 108, may compare the received measurements with previous measurements stored in the private data store 124.

The hyperledger application 120 of computer system 116 writes to the private data store 124 where the hyperledger application 120 may maintain a secure data structure, such as a hyperledger data structure, and provide an API that restricts access to the private data store 124 to only properly credentialed users, including properly credentialed UE 102. For example, the private data store 124 may contain a list (e.g., a whitelist) of identifiers (e.g., internet protocol (IP) addresses, etc.) of selected UE 102 which have been provided with access to the private data store 124.

The hyperledger data structure maintained in the private data store 124 comprises a plurality of blockchains 126, where each blockchain 126 is associated with a specific containerized network slice 150 of the plurality of containerized network slices 150 hosted by the one or more network servers 108. Alternatively, the private data store 124 comprises a single blockchain that includes blocks associated with a plurality of different containerized network slices 150.

Each block 128, 130, and 132 in a given blockchain 126 of private data store 124 may comprise a hash of the previous block of the block chain, a data content portion, a nonce or random number selected to satisfy a predefined condition, and a hash over the hash of the previous block and over the data content portion. In this manner, the data content portion may be made immutable whereby it is not subject to tampering by malware or by a hacker seeking access to the private data store 124. It is understood that while the blockchain 126 shown in FIG. 1 is illustrated as including three separate blocks 128, 130, and 132, each blockchain 126 of private data store 124 may comprise any number of blocks and that additional blocks may be added to the blockchain 160 over time.

In an embodiment, the data content of the blocks 128, 130, and 132 of each blockchain 126 may include measurements performed by the measurement application 114 of one of the network servers 108 of one or more parameters of the OS 110 associated with a specific containerized network slice 150 hosted on the network server 108. To state in other words, each blockchain 126 of private data store 124 may include measurements of one or more parameters of the OS partition 152 of a particular containerized network slice 150. In an embodiment, each of the unique containerized network slices 150 may have a dedicated blockchain 126 of private data store 124 in which measurements performed by the measurement applications 114 of the one or more network servers 108 may be securely stored in an immutable fashion, preventing tampering to the stored measurements.

The data content of one or more of the blocks 128, 130, and 132 of each blockchain 126 may additionally include authorization information regarding which UE 102 communicatively coupled with network 106 is permitted access to the specific blockchain 126 of private data store 124. For example, one or more of the plurality of containerized network slices 150 may be associated with a first enterprise (e.g., a railroad enterprise, an electric utility enterprise, a food processing enterprise, etc.); the blocks 128, 130, and 132 of the particular blockchains 126 which store the measurements pertaining to the one or more containerized network slices 150 and associated with the first enterprise may include authorization information authorizing only the UE 102 also associated with the first enterprise, thereby preventing access to other users. In an embodiment, the information about authorizations of the UE 102 may be defined in microcontracts and/or executable instructions. In an embodiment, the data content of one or more of the blocks 128, 130, and 132 of one or more blockchains 126 may comprise executable instructions configured to vet and validate OS measurements being received by the blockchain 126. To state in other words, the instructions to compare currently measured parameters of an OS with either previously stored parameters or OS parameter norms may be stored in one or more blockchains 126 of private data store 124 and may be invoked by appraisal application 118 to perform the comparison.

In the manner described above, private data store 124 provides a centralized, private store of data pertaining to the measurements performed by the measurement applications 114 of the one or more network servers 108 that may be distributed only to authorized parties. While private data store 124 is shown in FIG. 1 as comprising a hyperledger data structure comprising a plurality of blockchains 126, in other embodiments, private data store 124 may comprise other data structures in which the measurements performed by the measurement applications 114 of the one or more network servers 108 may be stored in a secure, immutable fashion.

As described above, the appraisal application 118 may receive current measurements of one or more parameters of OS 110 of one of the network servers from the measurement application 114 of the network server 108. Additionally, appraisal application 118 may retrieve previously stored measurements of the one or more parameters of the subject OS 110 from the private data store 124, and compare the current measurements of the one or more parameters of the subject OS 110 with the previously stored measurements to identify a change in the one or more parameters of the subject OS 110.

For example, appraisal application 118 may compare the current measurements with previous measurements which were performed by the measurement application 114 at a time when the subject OS 110 is assumed to not have been compromised by malware or a malicious actor, such as at initiation of the subject network server 108. To state in other words, appraisal application 118 may compare the current measurements of the one or more parameters of the subject OS 110 with a "golden master" of the one or more parameters of the subject OS 110 to identify changes to the one or more parameters that may indicate that the subject OS 110 has been compromised by malware and/or by a malicious actor. For instance, appraisal application 118 may identify a change in performance parameters, resource parameters, and/or bandwidth parameters of the OS 110. The golden master of the one or more parameters of the subject OS 110 may comprise a first or initial measurement of the one or more parameters of the subject OS 110 performed by the measurement application 114.

In an embodiment, hyperledger application 120 may store the results of the comparison performed by the appraisal application 118 in a blockchain 126 of private data store 124 associated with the subject OS 110. In addition, hyperledger application 120 may store the current measurements performed by the measurement application 114 in the blockchain 126 associated with the subject OS 110 along with the previously stored measurements which were compared against the current measurements. Over time, as measurements of the one or more parameters of the subject OS 110 are transmitted to the computer system 116 from the subject network server 108, hyperledger application 120 may repeatedly store newly received measurements in the blockchain 126 of private data store 124 associated with the subject OS 110 whereby a database of measurements of the one or more parameters of the subject OS 110 performed at different points in time by measurement application 114 may be created and continually added to by hyperledger application 120.

In addition, over time, measurements of one or more parameters of the OSs 110 of a plurality of network servers 108 may be stored in one or more of the blockchains 126 of private data store 124, via the operation of hyperledger application 120. In this manner, a database of measurements performed at different points in time of one or more parameters of the OSs 110 of a plurality of network servers 108 may be created. In an embodiment, an application of computer system 116, such as appraisal application 118, may statistically analyze the database of parameters of the OSs 110 and thereby develop or create one or more OS parameter norms associated with the OSs 110 of the plurality of network servers 108. Hyperledger application 120 may store the OS parameter norms in one or more of the blockchains 126 of private data store 124, and the OS parameter norms stored in private data store 124 may be continually updated by appraisal application 118 as new measurements of the one or more parameters of the OSs 110 of the plurality of network servers 108 are received by the computer system 116.

In an embodiment, the appraisal application 118 may, upon receiving current measurements of one of the OSs 110 of the plurality of network servers 108, retrieve the OS parameter norms associated with the plurality of network servers 108 from the private data store 124, and compare the current measurements of the subject OS 110 with the OS parameter norms to identify changes to the subject OS 110 that may indicate that the subject OS 110 has been compromised. Thus, instead of comparing one or more parameters of the subject OS 110 with a golden master associated with the subject OS 110, appraisal application 118 may identify a change to one or more parameters of the subject OS 110 indicative of the OS 110 being compromised based on a deviation from one or more OS parameter norms derived from data associated with the OSs 110 of a plurality of network servers 108.

The OS parameter norms may be associated with a particular containerized network slice 150. For example, one or more of the containerized network slices 150 may comprise containerized eMBB network slices, containerized mMMTC network slices, and containerized URLLC network slices of a 5G network. In an embodiment, appraisal application 118 may determine one or more OS parameter norms associated with the containerized eMBB network slices, containerized mMMTC network slices, and/or containerized URLLC network slices of the 5G network. Appraisal application 118, upon receiving current measurements of one or more parameters of an OS partition 152 of a containerized network slice 150 comprising, for example, an eMBB network slice, may compare the current measurements with the OS parameter norms associated with the containerized eMBB network slices to identify a change in the one or more parameters of the subject OS partition 152 indicative of the subject containerized network slice 150 being compromised.

Alternatively or in addition, one or more of the containerized network slices 150 hosted by the network servers 108 may be associated with a particular enterprise or enterprise category, such as a railroad companies enterprise category, an electric utilities enterprise category, a food processing enterprise category, etc. In an embodiment, appraisal application 118 may determine one or more OS parameter norms corresponding to a plurality of containerized network slices 150 associated with a specific enterprise. Appraisal application 118, upon receiving current measurements of one or more parameters of an OS partition 152 of a containerized network slice 150 corresponding to, for example, a railroad enterprise, may compare the current measurements with the OS parameter norms associated with the containerized network slices 150 associated with the subject railroad enterprise to identify a change in the one or more parameters of the subject OS partition 152 indicative of the subject containerized network slice 150 being compromised. The results of the comparison may be stored in the private data store 124 via hyperledger application 120 and may be distributed to UE 102 associated with the subject railroad enterprise.

The remediation application 122 of computer system 116 may be configured to perform one or more remedial actions in response to the appraisal application identifying a change in the one or more parameters of an OS (e.g., an OS 110 of one of the network servers 108 and/or an OS partition 152 of one of the containerized network slices 150 hosted by the network servers 108). While the computer system 116 shown in FIG. 1 includes both appraisal application 118 and remediation application 122, in other embodiments, the functions performed by remediation application 122 described herein may be performed by appraisal application 118.

In an embodiment, the remediation application 122 may notify a stakeholder or administrator of the network server 108 comprising the OS 110 and/or containerized network slice 150 identified as being potentially compromised based on changes between measurements of the OS 110 and/or containerized network slice 150 and previously stored measurements or OS parameter norms associated with the OS 110 and/or containerized network slice 150. Having been notified by remediation application 122, the administrator of the network server 108 may remove the network server 108 from the network 106 to prevent the infection (e.g., via malware or via illicitly gained access to the network server 108 by a malicious actor) from propagating through the network 106.

The remediation application 122 may take actions other than or in addition to notifying an administrator of network server 108. In an embodiment, remediation application 122 may, in response to identifying a change in one or more parameters of an OS (e.g., an OS 110 of one of the network servers 108 and/or an OS partition 152 of one of the containerized network slices 150 hosted by the network servers 108), automatically change the one or more parameters of the subject OS to correspond to previously measured and stored one or more parameters of the OS. For example, remediation application 122 may, upon identifying a change to one or more parameters of an OS 110 of one of the network servers 108, automatically change the one or more parameters of the OS 110 to correspond to a golden master of the one or more parameters of the OS 110.

In an embodiment, an artificial intelligence (AI) algorithm (storable in one or more blockchains 126 of private data store 124) may be invoked (e.g., by the appraisal application 118 and/or remediation application 122) to "self-heal" an OS (e.g., one of the OSs 110 or OS partitions 152) upon identifying a change to one or more parameters of an OS. Particularly, the AI algorithm may monitor or analyze trends in a plurality of measurements of the one or more parameters of the subject OS stored in one or more blockchains 126 of the private data store 124 in order to automatically and programmatically identify abnormalities in currently measured one or more parameters of the subject OS. In addition, through analyzing trends in a plurality of measurements of the one or more parameters of the subject OS stored in one or more blockchains 126 of the private data store 124, may allow computer system 116 to "rewind the future" and return one or more parameters of the subject OS to an earlier state that existed prior to the identification of changes or abnormalities in the one or more parameters without needing to rely on a golden master of the one or more parameters of the OS. Further, the AI algorithm, through analyzing trends in a plurality of measurements of the one or more parameters of the subject OS stored in one or more blockchains 126 of the private data store 124, may be able to determine a cause or causes (e.g., malware, illicit access by a malicious actor, etc.) of the compromisation of the subject OS indicated by the change in the one or more parameters of the subject OS.

As described above, the measurement application 114 may measure and transmit one or more parameters of OS 110 and/or the OS partition 152 of the containerized network slices 150 at periodic intervals, or in response to the occurrence of an event or sequence of events. In an embodiment, the interface function 140 of communication system 100 may at least partially govern the operation of the measurement application 114 of the one or more network servers 108. One or more of the network servers 108 may comprise an end system, network 106 may comprise a core network, such as a 5G core network, and the interface function 140 may comprise a 5G SCEF/NEF interface which provides an interface that provides the network server 108 with access to the network 106.

In an embodiment, the interface function 140 may confirm a state of a network server 108 before allowing the network server 108 to access the network 106 (e.g., for storage, pass-through, etc.). To state in other words, prior to granting the network server 108 with access to the network 106, interface function 140 may serve a gatekeeping function by requiring the appraisal application 118 of the computer system 116 to confirm that the one or more parameters of the OS 110 (or any of the OS partitions 152 of the containerized network slices 150 hosted on the network sever 108) have not changed from either previously stored parameters of the OS 110 or one or more OS parameter norms associated with the subject OS 110.

For example, in response to a request or other indication that the network server 108 seeks access to the network 106 (e.g., in response to a containerized network slice 150 hosted by a network server 108 being invoked by UE 102, etc.), the interface function 140 may trigger the measurement application 114 of the network server 108 to measure one or more parameters of the OS 110 (or any of the OS partitions 152 of the containerized network slices 150 hosted on the network sever 108) of the network server 108, and transmit or telegraph the currently measured one or more parameters to the appraisal application 118 of computer system 116 for comparison with previously stored parameters of the OS 110 or one or more OS parameter norms associated with the subject OS 110. Alternatively, in response to a containerized network slice 150 hosted by a network server 108 being invoked by a component of the communication system 100, such as UE 102, the measurement application 114 of network server 108 may itself be triggered to measure one or more parameters of the OS 110 (or any of the OS partitions 152 of the containerized network slices 150 hosted on the network sever 108) of the network server 108, and transmit or telegraph the currently measured one or more parameters to the appraisal application 118 of computer system 116 for comparison with previously stored parameters of the OS 110 or one or more OS parameter norms associated with the subject OS 110.

In response to the appraisal application 118 confirming that the currently measured one or more parameters have not changed from the previously stored parameters or the OS parameter norms, the network server 108 may be granted access to the network 106. For example, the network server 108 may present a token to the interface function 140 indicating that the appraisal application 118 has confirmed that the currently measured one or more parameters have not changed from the previously stored parameters or the OS parameter norms. Additionally, a record of the confirmation may be stored in one or more blockchains 126 of the private data store 124 via hyperledger application 120. In response to the appraisal application 118 determining that a change has taken place between currently measured one or more parameters have not changed from the previously stored parameters or the OS parameter norms, the network server 108 may be granted access to the network 106 and the remediation application 122 of computer system 116 may perform a remedial action, such as alerting an administrator of network 106, network server 108, and/or other stakeholders. Additionally, a record of the identified change in the currently measured one or more parameters may be stored in one or more blockchains 126 of private data store 124.

In an embodiment, the interface function 140 may be configured to ensure that an invoked containerized network slice 150 of a network server 108 is not leaking sensitive data, such as PII, into the network 106 or to other devices or computer systems communicatively coupled therewith. For example, monitoring tools of the network server 108 may mark particular data executing on the network server 108 whereby the interface function 140, when the marked data is transmitted therethrough, may determine whether the marked data is being transmitted to an acceptable destination (as defined by the marking performed by the monitoring tools 112), and may block the transmission of the marked data if the marked data is not being transmitted to an acceptable destination.

Figure 3:
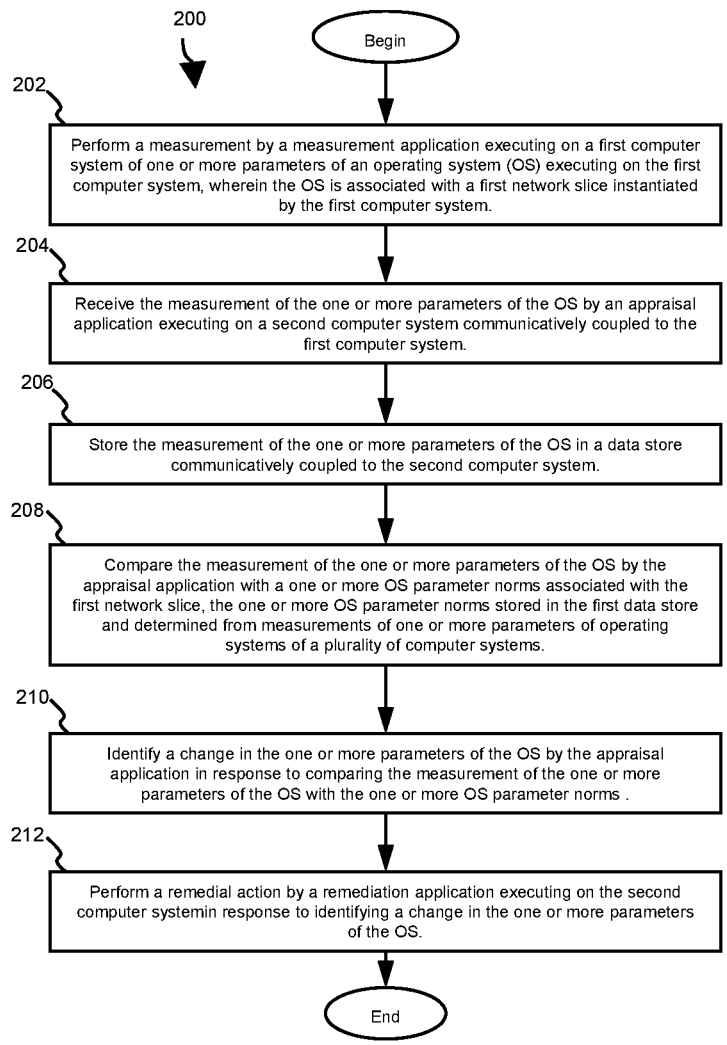
FIG. 3 is a flow chart of a method according to an embodiment of the disclosure.

Turning to FIG. 3, a method 200 is described. In an embodiment, the method 200 is a method for remotely monitoring and identifying changes in one or more parameters of an OS. At block 202, the method 200 comprises performing a measurement by a measurement application of a first computer system of the one or more parameters of the OS executing on the first computer system, wherein the OS is associated with a first network slice instantiated by the first computer system. At block 204, the method 200 comprises receiving the measurement of the one or more parameters of the OS by an appraisal application executing on a second computer system communicatively coupled to the first computer system.

At block 206, the method 200 comprises storing the measurement of the one or more parameters of the OS in a data store communicatively coupled to the second computer system. At block 208, the method 200 comprises comparing the measurement of the one or more parameters of the OS by the appraisal application with one or more OS parameter norms associated with the first network slice, the one or more OS parameter norms stored in the data store and determined from measurements of one or more parameters of OSs of a plurality of computer systems. At block 210, the method 200 comprises identifying a change in the one or more parameters of the OS by the appraisal application in response to comparing the measurement of the one or more parameters of the OS with the one or more OS parameter norms. At block 212, the method 200 comprises performing a remedial action by a remediation application executing on the second computer system in response to identifying a change in the one or more parameters of the OS.

Figure 4:
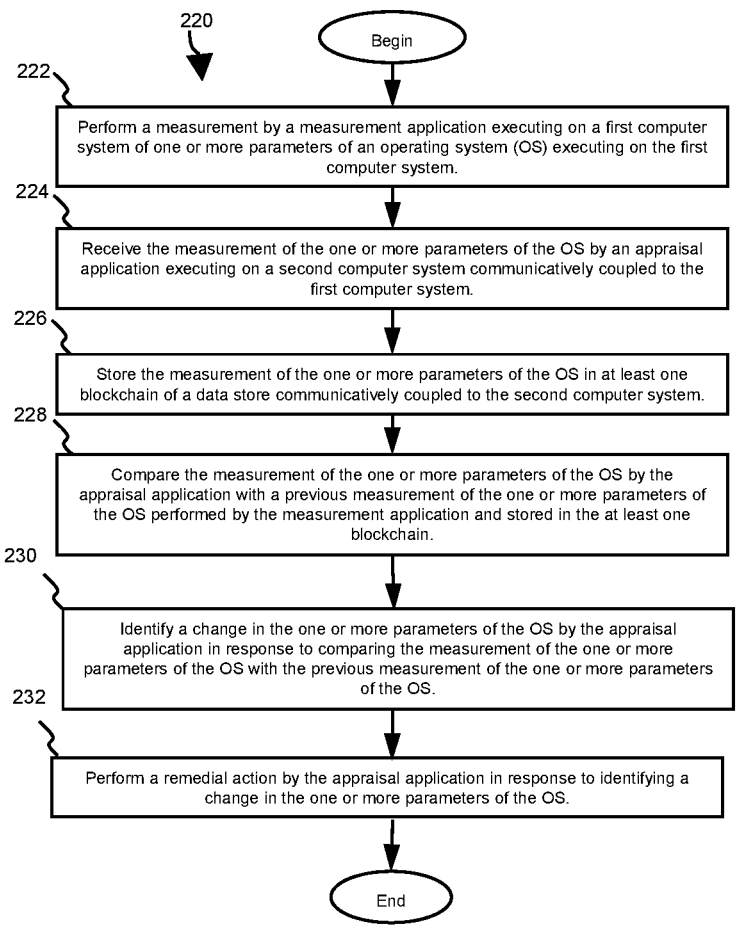
FIG. 4 is a flow chart of another method according to an embodiment of the disclosure.

Turning to FIG. 4, another method 220 is described. In an embodiment, the method 220 is another method for remotely monitoring and identifying changes in one or more parameters of an OS. At block 222, the method 220 comprises performing a measurement by a measurement application of a first computer system of the one or more parameters of the OS executing on the first computer system. At block 224, the method 220 comprises receiving the measurement of the one or more parameters of the OS by an appraisal application executing on a second computer system communicatively coupled to the first computer system. At block 226, the method 220 comprises storing the measurement of the one or more parameters of the OS immutably in at least one blockchain of a data store communicatively coupled to the second computer system.

At block 228, the method 220 comprises comparing the measurement of the one or more parameters of the OS by the appraisal application with a previous measurement of the one or more parameters of the OS performed by the measurement application and stored in the at least one blockchain. At block 230, the method 220 comprises identifying a change in the one or more parameters of the OS by the appraisal application in response to comparing the measurement of the one or more parameters of the OS with the previous measurement of the one or more parameters of the OS. At block 232, the method 220 comprises automatically changing the one or more parameters of the OS to correspond to the previously measured one or more parameters of the OS by a remediation application executing on the second computer system in response to identifying the change in the one or more parameters of the OS.

Figure 5A:
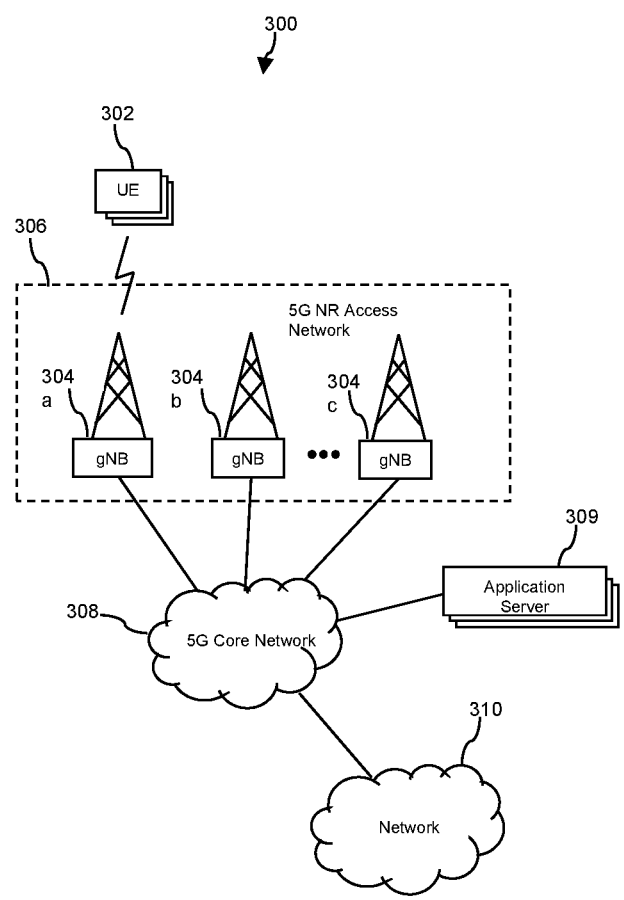
FIG. 5A is a block diagram of another communication system according to an embodiment of the disclosure.

Turning now to FIG. 5A, an exemplary communication system 300 is described. At least some of the components of communication system 100 (e.g., one or more of UEs 102, access node 104, network 106, etc.) shown in FIG. 1 may be implemented in accordance and in a matter consistent with the teachings of communication system 300 shown in FIG. 5A. Typically the communication system 300 includes a number of access nodes 304 that are configured to provide coverage in which UEs 302 such as cell phones, tablet computers, machine-type-communication devices, tracking devices, embedded wireless modules, and/or other wirelessly equipped communication devices (whether or not user operated), can operate. In some embodiments, access node 104 of the communication system 100 shown in FIG. 1 may be configured similarly as access nodes 304 of communication system 300. Additionally, in some embodiments, one or more of UEs 102 of the communication system 100 shown in FIG. 1 may be configured similarly as UEs 302. The access nodes 304 may be said to establish an access network 306. The access network 306 may be referred to as a radio access network (RAN) in some contexts. In a 5G technology generation an access node 304 may be referred to as a gigabit Node B (gNB). In 4G technology (e.g., long term evolution (LTE) technology) an access node 304 may be referred to as an enhanced Node B (eNB). In 3G technology (e.g., code division multiple access (CDMA) and global system for mobile communication (GSM)) an access node 304 may be referred to as a base transceiver station (BTS) combined with a basic station controller (BSC). In some contexts, the access node 304 may be referred to as a cell site or a cell tower. In some implementations, a picocell may provide some of the functionality of an access node 304, albeit with a constrained coverage area. Each of these different embodiments of an access node 304 may be considered to provide roughly similar functions in the different technology generations.

In an embodiment, the access network 306 comprises a first access node 304a, a second access node 304b, and a third access node 304c. It is understood that the access network 306 may include any number of access nodes 304. Further, each access node 304 could be coupled with a core network 308 that provides connectivity with various application servers 309 and/or a network 310. In some embodiments, network 106 of the communication system 100 shown in FIG. 1 may be configured similarly as core network 308. In an embodiment, at least some of the application servers 309 may be located close to the network edge (e.g., geographically close to the UE 302 and the end user) to deliver so-called "edge computing." The network 310 may be one or more private networks, one or more public networks, or a combination thereof. The network 310 may comprise the public switched telephone network (PSTN). The network 310 may comprise the Internet. With this arrangement, a UE 302 within coverage of the access network 306 could engage in air-interface communication with an access node 304 and could thereby communicate via the access node 304 with various application servers and other entities.

The communication system 300 could operate in accordance with a particular radio access technology (RAT), with communications from an access node 304 to UEs 302 defining a downlink or forward link and communications from the UEs 302 to the access node 304 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 304 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 304 could define an air interface configured in a specific manner to define physical resources for carrying information wirelessly between the access node 304 and UEs 302.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 302.

In addition, certain resource elements on the example air interface could be reserved for special purposes. For instance, on the downlink, certain resource elements could be reserved to carry synchronization signals that UEs 302 could detect as an indication of the presence of coverage and to establish frame timing, other resource elements could be reserved to carry a reference signal that UEs 302 could measure in order to determine coverage strength, and still other resource elements could be reserved to carry other control signaling such as PRB-scheduling directives and acknowledgement messaging from the access node 304 to served UEs 302. And on the uplink, certain resource elements could be reserved to carry random access signaling from UEs 302 to the access node 304, and other resource elements could be reserved to carry other control signaling such as PRB-scheduling requests and acknowledgement signaling from UEs 302 to the access node 304.

The access node 304, in some instances, may be split functionally into a radio unit (RU), a distributed unit (DU), and a central unit (CU) where each of the RU, DU, and CU have distinctive roles to play in the access network 306. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
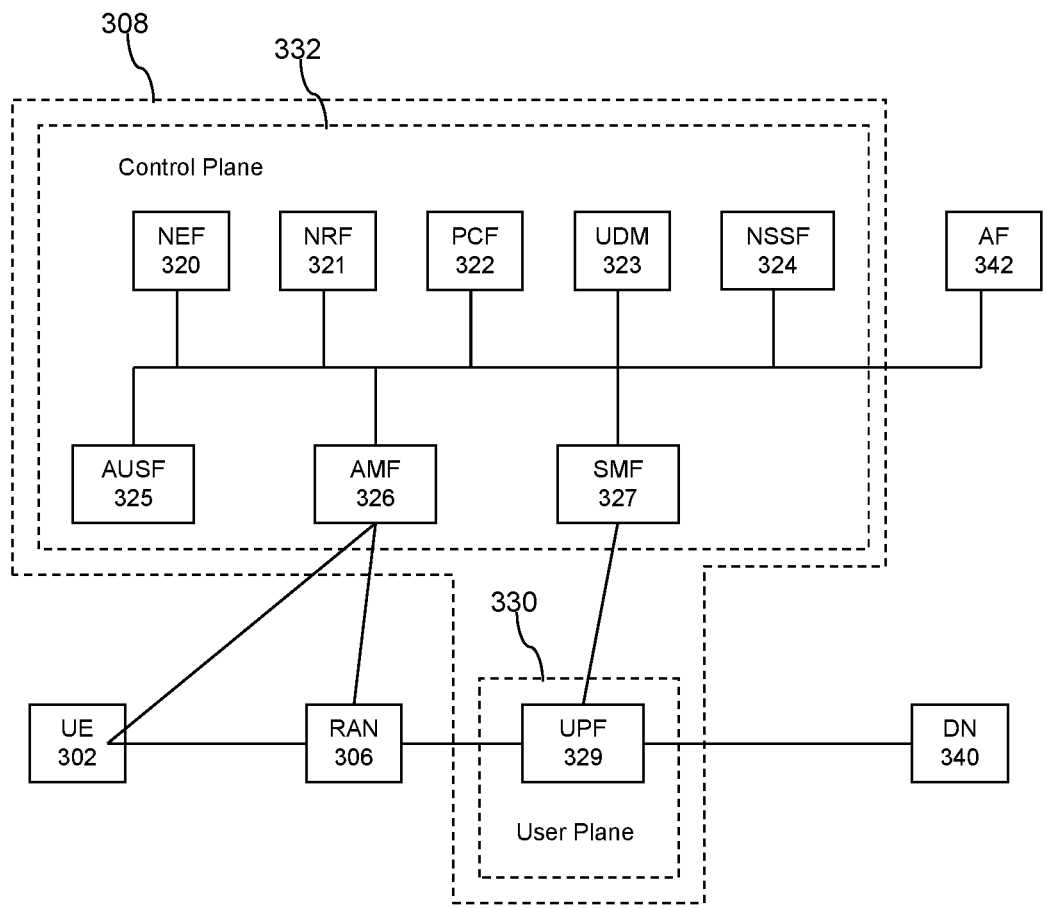
FIG. 5B is a block diagram of a core network of the communication system of FIG. 5A according to an embodiment of the disclosure.

Turning now to FIG. 5B, further details of the core network 308 are described. In an embodiment, the core network 308 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 329, an authentication server function (AUSF) 325, an access and mobility management function (AMF) 326, a session management function (SMF) 327, a network exposure function (NEF) 320, a network repository function (NRF) 321, a policy control function (PCF) 322, a unified data management (UDM) 323, a network slice selection function (NSSF) 324, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 308 may be segregated into a user plane 330 and a control plane 332, thereby promoting independent scalability, evolution, and flexible deployment.

The UPF 329 delivers packet processing and links the UE 302, via the access node 306, to a data network 340 (e.g., the network 310 illustrated in FIG. 5A). The AMF 326 handles registration and connection management of non-access stratum (NAS) signaling with the UE 302. Said in other words, the AMF 326 manages UE registration and mobility issues. The AMF 326 manages reachability of the UEs 302 as well as various security issues. The SMF 327 handles session management issues. Specifically, the SMF 327 creates, updates, and removes (destroys) protocol data unit (PDU) sessions and manages the session context within the UPF 329. The SMF 327 decouples other control plane functions from user plane functions by performing dynamic host configuration protocol (DHCP) functions and IP address management functions. The AUSF 325 facilitates security processes.

The NEF 320 securely exposes the services and capabilities provided by network functions. The NRF 321 supports service registration by network functions and discovery of network functions by other network functions. The PCF 322 supports policy control decisions and flow based charging control. The UDM 323 manages network user data and can be paired with a user data repository (UDR) that stores user data such as customer profile information, customer authentication number, and encryption keys for the information. An application function 342, which may be located outside of the core network 308, exposes the application layer for interacting with the core network 308. In an embodiment, the application function 342 may be execute on an application server 309 located geographically proximate to the UE 302 in an "edge computing" deployment mode. The core network 308 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 324 can help the AMF 326 to select the network slice instance (NSI) for use with the UE 302.

Figure 6:
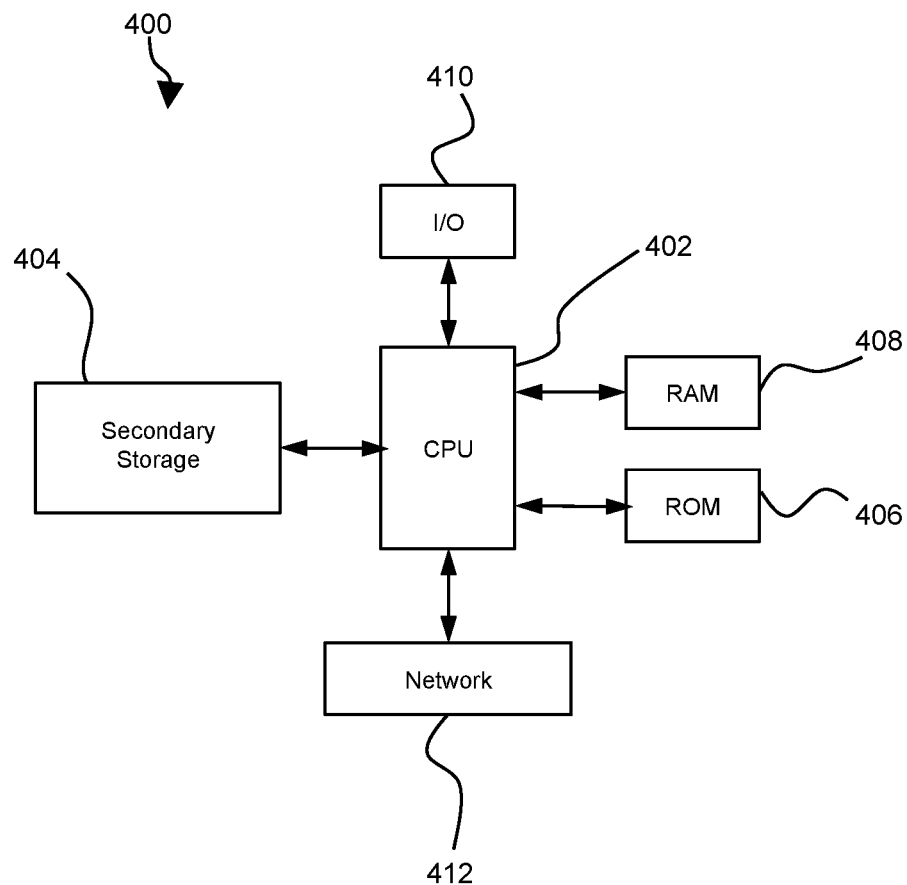
FIG. 6 is a block diagram of a computer system according to an embodiment of the disclosure.

FIG. 6 illustrates a computer system 400 suitable for implementing one or more embodiments disclosed herein. The computer system 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips.

It is understood that by programming and/or loading executable instructions onto the computer system 400, at least one of the CPU 402, the RAM 408, and the ROM 406 are changed, transforming the computer system 400 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 400 is turned on or booted, the CPU 402 may execute a computer program or application. For example, the CPU 402 may execute software or firmware stored in the ROM 406 or stored in the RAM 408. In some cases, on boot and/or when the application is initiated, the CPU 402 may copy the application or portions of the application from the secondary storage 404 to the RAM 408 or to memory space within the CPU 402 itself, and the CPU 402 may then execute instructions that the application is comprised of. In some cases, the CPU 402 may copy the application or portions of the application from memory accessed via the network connectivity devices 412 or via the I/O devices 410 to the RAM 408 or to memory space within the CPU 402, and the CPU 402 may then execute instructions that the application is comprised of. During execution, an application may load instructions into the CPU 402, for example load some of the instructions of the application into a cache of the CPU 402. In some contexts, an application that is executed may be said to configure the CPU 402 to do something, e.g., to configure the CPU 402 to perform the function or functions promoted by the subject application. When the CPU 402 is configured in this way by the application, the CPU 402 becomes a specific purpose computer or a specific purpose machine.

The secondary storage 404 is typically comprised of one or more disk drives or tape drives and is used for non-volatile storage of data and as an over-flow data storage device if RAM 408 is not large enough to hold all working data. Secondary storage 404 may be used to store programs which are loaded into RAM 408 when such programs are selected for execution. The ROM 406 is used to store instructions and perhaps data which are read during program execution. ROM 406 is a non-volatile memory device which typically has a small memory capacity relative to the larger memory capacity of secondary storage 404. The RAM 408 is used to store volatile data and perhaps to store instructions. Access to both ROM 406 and RAM 408 is typically faster than to secondary storage 404. The secondary storage 404, the RAM 408, and/or the ROM 406 may be referred to in some contexts as computer readable storage media and/or non-transitory computer readable media.

I/O devices 410 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 412 may provide wired communication links and/or wireless communication links (e.g., a first network connectivity device 412 may provide a wired communication link and a second network connectivity device 412 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 412 may enable the processor 402 to communicate with the Internet or one or more intranets. With such a network connection, it is contemplated that the processor 402 might receive information from the network, or might output information to the network in the course of performing the above-described method steps. Such information, which is often represented as a sequence of instructions to be executed using processor 402, may be received from and outputted to the network, for example, in the form of a computer data signal embodied in a carrier wave.

Such information, which may include data or instructions to be executed using processor 402 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 402 executes instructions, codes, computer programs, scripts which it accesses from hard disk, floppy disk, optical disk (these various disk based systems may all be considered secondary storage 404), flash drive, ROM 406, RAM 408, or the network connectivity devices 412. While only one processor 402 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 404, for example, hard drives, floppy disks, optical disks, and/or other device, the ROM 406, and/or the RAM 408 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly bound to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 400, at least portions of the contents of the computer program product to the secondary storage 404, to the ROM 406, to the RAM 408, and/or to other non-volatile memory and volatile memory of the computer system 400. The processor 402 may process the executable instructions and/or data structures in part by directly accessing the computer program product, for example by reading from a CD-ROM disk inserted into a disk drive peripheral of the computer system 400. Alternatively, the processor 402 may process the executable instructions and/or data structures by remotely accessing the computer program product, for example by downloading the executable instructions and/or data structures from a remote server through the network connectivity devices 412. The computer program product may comprise instructions that promote the loading and/or copying of data, data structures, files, and/or executable instructions to the secondary storage 404, to the ROM 406, to the RAM 408, and/or to other non-volatile memory and volatile memory of the computer system 400.

In some contexts, the secondary storage 404, the ROM 406, and the RAM 408 may be referred to as a non-transitory computer readable medium or a computer readable storage media. A dynamic RAM embodiment of the RAM 408, likewise, may be referred to as a non-transitory computer readable medium in that while the dynamic RAM receives electrical power and is operated in accordance with its design, for example during a period of time during which the computer system 400 is turned on and operational, the dynamic RAM stores information that is written to it. Similarly, the processor 402 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for monitoring and identifying changes in one or more parameters of an operating system (OS), comprising:
    a processor;
    a non-transitory memory; and
    one or more applications stored in the non-transitory memory that, when executed by the processor:
        receive a measurement of the one or more parameters of a first OS executing on a computer system, wherein the measurement of the one or more parameters of the first OS is performed by a measurement application executing on the computer system, and wherein the first OS is associated with a first network slice instantiated by the computer system, wherein the first network slice comprises at least one of an enhanced mobile broadband (eMBB) network slice, a massive machine-type communications (mMTC) network slice, or an ultra-reliable low-latency communications (URLLC) network slice of a 5G network;
        store the measurement of the one or more parameters of the first OS in a data store communicatively coupled to the non-transitory memory;
        compare the measurement of the one or more parameters of the first OS with one or more first OS parameter norms associated with the first network slice, the one or more first OS parameter norms stored in the data store and determined from measurements of one or more parameters of a first plurality of OSs; and
        identify a change in the one or more parameters of the first OS in response to comparing the measurement of the one or more parameters of the first OS with the one or more first OS parameter norms.

2. The system of claim 1, wherein the first network slice comprises a containerized 5G network slice and the first OS comprises a first partition of an underlying OS of the first computer system.

3. The system of claim 1, wherein the first network slice, the first plurality of OSs, and the one or more first OS parameter norms each correspond to a first enterprise category.

4. The system of claim 3, wherein the one or more applications stored in the non-transitory memory that, when executed by the processor:
    receive a measurement of the one or more parameters of a second OS executing on the computer system, wherein the measurement of the one or more parameters of the second OS are performed by the measurement application and wherein the second OS is associated with a second network slice instantiated by the computer system;
    store the measurement of the one or more parameters of the second OS in the data store;
    compare the measurement of the one or more parameters of the second OS with one or more second OS parameter norms associated with the second network slice, the one or more second OS parameter norms stored in the data store and determined from measurements of one or more parameters of a second plurality of OSs; and
    identify a change in the one or more parameters of the second OS in response to comparing the measurement of the one or more parameters of the second OS with the one or more second OS parameter norms.

5. The system of claim 1, wherein:
    the measurement of the one or more parameters of the first OS are stored in at least one blockchain of the data store; and
    the one or more applications stored in the non-transitory memory that, when executed by the processor automatically change the one or more parameters of the first OS to correspond to a previously measured one or more parameters of the first OS by a remediation application executing on the second computer system in response to identifying the change in the one or more parameters of the first OS.

6. A method for monitoring and identifying changes in one or more parameters of an operating system (OS), comprising:
performing a measurement by a measurement application of a first computer system of the one or more parameters of a first OS executing on the first computer system, wherein the first OS is associated with a first network slice instantiated by the first computer system, wherein the first network slice comprises at least one of an enhanced mobile broadband (eMBB) network slice, a massive machine-type communications (mMTC) network slice, or an ultra-reliable low-latency communications (URLLC) network slice of a 5G network;
receiving the measurement of the one or more parameters of the first OS by an appraisal application executing on a second computer system communicatively coupled to the first computer system;
storing the measurement of the one or more parameters of the first OS in a data store communicatively coupled to the second computer system;
comparing the measurement of the one or more parameters of the first OS by the appraisal application with one or more first OS parameter norms associated with the first network slice, the one or more first OS parameter norms stored in the data store and determined from measurements of one or more parameters of a first plurality of OSs; and
identifying a change in the one or more parameters of the first OS by the appraisal application in response to comparing the measurement of the one or more parameters of the first OS with the one or more first OS parameter norms.

7. The method of claim 6, wherein the first network slice comprises a containerized 5G network slice and the first OS comprises a first partition of an underlying OS of the first computer system.

8. The method of claim 6, wherein the first network slice, the first plurality of OSs, and the one or more first OS parameter norms each correspond to a first enterprise category.

9. The method of claim 8, further comprising:
performing a measurement by the measurement application of the first computer system of one or more parameters of a second OS executing on the first computer system, wherein the second OS is associated with a second network slice instantiated by the first computer system;
receiving the measurement of the one or more parameters of the second OS by the appraisal application;
storing the measurement of the one or more parameters of the second OS in the data store;
comparing the measurement of the one or more parameters of the second OS by the appraisal application with one or more second OS parameter norms associated with the second network slice, the one or more second OS parameter norms stored in the data store and determined from measurements of one or more parameters of a second plurality of OSs; and
identifying a change in the one or more parameters of the second OS by the appraisal application in response to comparing the measurement of the one or more parameters of the second OS with the one or more second OS parameter norms.

10. The method of claim 9, wherein:
the second network slice, the second plurality of OSs, and the one or more second OS parameter norms each correspond to a second enterprise category that is distinct from the first enterprise category;
a first user-equipment (UE) associated with the first enterprise category is provided access to the one or more first OS parameter norms stored in the data store but not the one or more second OS parameter norms stored in the data store; and
a second associated with the second enterprise category is provided access to the one or more second OS parameter norms stored in the data store but not the one or more first OS parameter norms stored in the data store.

11. The method of claim 6, wherein:
the measurement of the one or more parameters of the first OS are stored in at least one blockchain of the data store; and
the method further comprises automatically changing the one or more parameters of the first OS to correspond to a previously measured one or more parameters of the first OS by a remediation application executing on the second computer system in response to identifying the change in the one or more parameters of the first OS.

12. A method for monitoring and identifying changes in one or more parameters of an operating system (OS), comprising:
performing a measurement by a measurement application of a first computer system of the one or more parameters of the OS executing on the first computer system, wherein the OS is associated with a network slice instantiated by the first computer system, wherein the network slice comprises at least one of an enhanced mobile broadband (eMBB) network slice, a massive machine-type communications (mMTC) network slice, or an ultra-reliable low-latency communications (URLLC) network slice of a 5G network;
receiving the measurement of the one or more parameters of the OS by an appraisal application executing on a second computer system communicatively coupled to the first computer system;
storing the measurement of the one or more parameters of the OS immutably in at least one blockchain of a data store communicatively coupled to the second computer system;
comparing the measurement of the one or more parameters of the OS by the appraisal application with a previous measurement of the one or more parameters of the OS performed by the measurement application and stored in the at least one blockchain;
identifying a change in the one or more parameters of the OS by the appraisal application in response to comparing the measurement of the one or more parameters of the OS with the previous measurement of the one or more parameters of the OS; and
automatically changing the one or more parameters of the OS to correspond to the previously measured one or more parameters of the OS by a remediation application executing on the second computer system in response to identifying the change in the one or more parameters of the OS.

13. The method of claim 12, wherein the previously measured one or more parameters of the OS comprise a first measurement of the one or more parameters of the OS.

14. The method of claim 12, wherein at least one of the blockchains of the data store comprises executable instructions invokable by the appraisal application to compare the measurement of the one or more parameters of the OS by the appraisal application with a previous measurement of the one or more parameters of the OS.

15. The method of claim 12, further comprising:
  requesting access by the first computer system to a 5G core network; and
  granting the first computer system with access to the 5G core network only on condition of confirming by an interface function that the currently measured one or more parameters of the OS have not changed from the previously measured one or more parameters of the OS, wherein the interface function comprises a 5G service capability exposure function (SCEF) or network exposure function (NEF).

16. The method of claim 12, further comprising comparing the measurement of the one or more parameters of the OS by the appraisal application with one or more OS parameter norms associated with the network slice, the one or more OS parameter norms stored in the data store and determined from measurements of one or more parameters of a plurality of OSs.

17. The method of claim 16, wherein the network slice, the plurality of OSs, and the one or more OS parameter norms each correspond to a first enterprise category.

* * * * *